United States Patent [19]
Robinson

[11] 3,725,463
[45] Apr. 3, 1973

[54] PROCESS FOR AROMATIC SUBSTITUTION

[75] Inventor: Robert E. Robinson, Columbia, S.C.

[73] Assignee: National Distillers and Chemical Corporation, New York, N.Y.

[22] Filed: Jan. 25, 1971

[21] Appl. No.: 109,628

Related U.S. Application Data

[60] Division of Ser. No. 809,406, March 21, 1969, Pat. No. 3,578,716, which is a continuation-in-part of Ser. No. 631,917, April 19, 1967, abandoned, which is a continuation-in-part of Ser. Nos. 282,559, May 23, 1963, abandoned, and Ser. No. 282,594, May 23, 1963, abandoned, and Ser. No. 282,595, May 23, 1963, abandoned.

[52] U.S. Cl. .................................................260/479 R
[51] Int. Cl. ...............................................C07c 69/14
[58] Field of Search ...................................260/479 R

[56] References Cited

UNITED STATES PATENTS 3,493,605   2/1970   Selwitz ..................................260/488

*Primary Examiner*—James A. Patten
*Attorney*—Allen A. Meyer, Jr.

[57] ABSTRACT

Substituted aromatic derivatives are prepared by reacting an aromatic compound with a Group VIII platinum metal salt wherein the substituent introduced is derived from the anion portion of said Group VIII platinum metal salt.

6 Claims, No Drawings

PROCESS FOR AROMATIC SUBSTITUTION

This application is a division of application Ser. No. 809,406, filed Mar. 21, 1969, (now U.S. Pat. No. 3,578,716) which is a continuation-in-part of application Ser. No. 631,917, filed Apr. 19, 1967 and now abandoned, which in turn is a continuation-in-part of applications Ser. No. 282,559 (filed 5/23/63) now abandoned, Ser. No. 282,594 (filed 5/23/63) now abandoned, and Ser. No. 282,595 (filed 5/23/63) now abandoned.

The present invention relates to a novel reaction of aromatic compounds. More particularly, it pertains to a novel process for preparing substituted aromatic derivatives, and particularly monochlorobenzene, by the reaction of an aromatic compound with a Group VIII platinum metal salt.

Monochlorobenzene is in demand commercially in large volume as an intermediate in the synthesis of phenol, aniline, DDT [1,1,1-trichloro-2,2-bis(p-chlorophenyl)ethane], and other products.

One approach to synthesizing monochlorobenzene has involved the reaction of benzene with a metal halide. An article by Kharasch et al. J. Am. Chem. Soc., 53, 3053 (1931), describes the chlorination of benzene in liquid phase at atmospheric pressure using auric chloride as the chlorinating agent. The reaction requires dry, thiophene-free benzene and anhydrous auric chloride. The presence of ether, acetic acid, alcohol, ethyl acetate, and other reagents containing oxygen prevents the reaction from taking place. Further, if the benzene is added to the auric chloride, only polysubstituted chlorobenzenes are produced. Regeneration of auric chloride from the precipitated aurous chloride formed in the reaction by treatment with chlorine gas is suggested as a means of making the reaction catalytic with respect to the gold salt. Such regeneration cannot be performed in situ if further chlorination of the benzene is to be avoided.

In a recent series of articles by Kovacic and coworkers, the direct reaction of ferric chloride with benzene and various substituted benzenes in anhydrous liquid phase reaction is explored. With alkyl and halo substituted benzenes, various isomeric mixtures are obtained. With benzene, the products comprise a small amount of chlorobenzene (no more than 6% yield) and a water-insoluble black solid. Chlorination fails to occur when $AlCl_3$, $SnCl_4$, and $CuCl_2$ are substituted as chlorinating agents for chlorobenzene in place of $FeCl_3$.

Accordingly, it is one object of this invention to convert benzene to monochlorobenzene by a more direct and more efficient process than is possible by prior art processes.

A further object of this invention is to provide a novel and effective process for the preparation of substituted aromatic compounds.

Another object of this invention is to provide a vapor phase process for introducing substituents onto the aromatic ring of aromatic compounds.

Further objects of this invention will become apparent from the following description and embodiments.

In accordance with this invention, substituted aromatic compounds are produced directly and effectively by reacting an aromatic compound with a Group VIII platinum metal salt.

The starting aromatic compound may be an aromatic hydrocarbon, e.g., benzene, naphthalene, anthracene, phenanthrene, toluene, p-xylene, ethyl benzene, and biphenyl; a phenol, e.g., phenol, catechol, resorcinol, hydroquinone, pyrogallol, m-cresol, picric acid, and alpha-naphthol; an aromatic alcohol, e.g., benzyl alcohol, cinnamyl alcohol, and triphenylcarbinol; an aromatic amine, e.g., aniline, o-toluidine, m-phenylenediamine, anthranilic acid, and alpha-naphthylamine; an aromatic ketone, e.g., benzophenone, acetophenone, phenylacetone, and alpha-chloroacetophenone; an aromatic nitro compound, e.g., nitrobenzene, m-dinitrobenzene, alpha-nitronaphthalene, and beta-nitroanthracene; an aromatic halide, e.g., fluorobenzene, chlorobenzene, bromobenzene, iodobenzene, m-dichlorobenzene, alpha-chloronaphthalene, and p-chlorotoluene; an arylsulfonic acid, e.g., benzenesulfonic acid, p-toluenesulfonic acid, sulfanilic acid, and alpha-naphthalenesulfonic acid; an arylcarboxylic acid, e.g., benzoic acid, phenyl acetic acid, cinnamic acid, p-aminobenzoic acid, o-toluic acid, terephthalic acid, alpha-naphthoic acid, and alpha-anthroic acid; an aromatic anhydride, e.g., phthalic anhydride, benzoic anhydride, and acetic benzoic anhydride; an aromatic ether, e.g., diphenyl ether, anisole, phenetole, anisaldehyde, and guiacol; an aromatic aldehyde, e.g., benzaldehyde, salicylaldehyde, cinnamaldehyde, and piperonal; a quinone, e.g., p-quinone, alpha-naphthoquinone, and anthraquinone; an aryl mercaptan, e.g., phenyl mercaptan, benzyl mercaptan, p-tolyl mercaptan, and biphenyl mercaptan; an aromatic amide, e.g., benzamide, phthalamide, phenylacetamide, and toluamide; an aromatic nitrile, e.g., benzonitrile, o-tolunitrile, phenylacetonitrile, and cinnamonitrile; as well as mixtures of two or more of the above compounds or types of compounds. Heterocyclic compounds, e.g., pyridine, thiophene, and quinoline, may also serve as the starting aromatic compound.

The platinum metal portion of the Group VIII metal salt may be palladium, platinum, ruthenium, rhodium, osmium or iridium. The anion portion may include a halide, e.g., fluoride, bromide, chloride, or iodide; a cyanide; a carboxylate such as acetate, propionate, benzoate, etc.; a cyanate; an alkoxide, such as methoxide or ethoxide; or an aromatic oxide, such as phenoxide or naphthoxide. Examples of Group VIII platinum metal salts suitable for the practice of this invention include palladous chloride, palladous bromide, platinous chloride, rhodium trichloride, palladous fluoride, palladous iodide, potassium chloropalladite, platinous bromide, platinous iodide, platinic bromide, ruthenium dichloride, ruthenium trichloride, osium dichloride, osmium trichloride, osmium tetrachloride, iridium trichloride, iridium tetrachloride, iridium tribromide, iridium tetrabromide, palladous acetate, palladous cyanide, palladium benzoate, palladous cyanate, palladous methoxide, palladous ethoxide, palladous phenoxide, and the like.

The Group VIII platinum metal component may be employed unsupported or supported on a suitable material, such as carbon, silica, alumina, or the like. The supported catalysts may be obtained commercially or may be prepared by any convenient means, such as by dissolving the metal salt or salts in a suitable solvent, e.g., water; adding the support, e.g., carbon; and evaporating the solvent with heat under vacuum. Only catalytic amounts need be employed, and specific amounts may vary from about 0.05 up to about 10 percent by weight, based on the total reaction mixture, with the preferred amount being within the range of about 0.2 to about 5 percent by weight.

The process of this invention may be carried out with the aromatic compound in either liquid or gas phase. To carry out the process with the aromatic compound in liquid phase, the reactants are charged to a suitable reactor, such as a conventional stirred reactor or an agitated pressure tube reactor, and thereafter agitated for a period of time at a suitable temperature, after which the product, which is a substituted aromatic compound or compounds, may be separated by conventional means, e.g., fractional distillation, decantation, filtration, etc. The aromatic compound may serve as the reaction medium, in which case it may be maintained in substantial excess of that required to react with the Group VIII platinum metal salt. Alternatively, an inert diluent may be added and, if desired, serve as the bulk of the reaction medium. Such inert diluents must be nonreactive with respect to the Group VIII platinum metal salt and the aromatic compound and must exert at least some solvent action thereon at the reaction temperature. Suitable diluents include water; acetic acid; aliphatic hydrocarbons, e.g., hexane, heptane, cyclohexane, and isopentane; other aliphatic compounds, e.g., dimethylformamide, butyl chloride, methanol, ethanol, dimethyl sulfoxide, acetonitrile, chloroform, carbon tetrachloride, and carbon disulfide; etc. It is preferred to use as the reaction medium a mixture of an excess of the aromatic compound undergoing reaction and water.

In carrying out the reaction satisfactorily, that the presence of an acid acceptor is not required and is, in fact, to be avoided. Thus, it is unnecessary to include acid acceptor materials or buffering agents capable of binding free acid present in the reaction mixture.

The course of the reaction is independent of the reaction pressure, the only requirement being that the pressure on the reaction mixture be such that at least a portion of the aromatic compound is maintained in liquid phase. Generally, the reaction is carried out under the autogenous pressure generated by the components of the reaction mixture. In practice, these pressures will range from about 1 atmosphere up to 100 atmospheres or more.

To carry out the process of this invention with the aromatic compound in gas phase, the aromatic compound is volatilized prior to its contact with the Group VIII platinum metal salt and subsequently contacted with the Group VIII platinum metal salt in a conventional manner and in conventional apparatus. For example, the Group VIII platinum metal salt may be placed in a tubular reactor and the aromatic compound in gaseous form passed or circulated through the reactor. The product, which is a substituted aromatic compound or compounds, may be recovered by conventional means from the exhaust gases. If desired, the Group VIII platinum metal salt may be supported on a suitable material, such as carbon, carbonate, silica, alumina, or the like. The supported salt may be obtained commercially or may be prepared by any convenient means, such as by dissolving the salt in a suitable solvent, e.g., water; adding the support, e.g., carbon; and evaporating the solvent with heat under vacuum.

The gas phase reaction generally is carried out at a pressure between about 0.25 to 250 atmospheres and preferably between about 1 and 100 atmospheres.

In one specific embodiment of the present invention, a gaseous stream comprising benzene and, if desired, a carrier gas is passed over palladous chloride, and the chlorobenzenes obtained as the product are recovered from the exhaust gases. A constant level of benzene in the gas stream may be maintained conveniently by saturating a carrier gas with benzene by passing it over or through liquid benzene and thereafter through the reactor. It is possible also, if desired, to vaporize the benzene separately in a flash chamber and to meter it in separately. The exhaust gases are cooled and scrubbed for the recovery of the chlorobenzenes. Thus the product, chlorobenzenes, is obtained in solution with excess benzene, if any, and this mixture may be separated by any convenient means, e.g., by fractional distillation.

The reaction between the Group VIII platinum metal salt and the aromatic compound to produce substituted aromatic compounds takes place between about 20° and 600°C. Preferably, however, the reaction when run in liquid phase is carried out at a temperature between about 100° and 300°C. and when run in vapor phase at a temperature between about 300° and 500°C.

The substituted aromatic compounds produced by the process of this invention are of two types: (1) a derivative of the starting aromatic compound containing as an additional substituent on an aromatic ring an anion portion of the Group VIII platinum metal salt and (2) a derivative of the starting aromatic compound containing as an additional substituent on an aromatic ring a duplicate of the starting compound less one hydrogen atom, that is, a dimer of the starting aromatic compound less two hydrogen atoms at the point of bonding. The first type of product can be obtained from the reaction of a halide of a Group VIII platinum metal, e.g., palladium chloride, and an aromatic compound, e.g., benzene, which produces an aromatic halide, e.g., chlorobenzene. Similarly, palladium chloride can be employed to convert chlorobenzene to o-, m-, and p-dichlorobenzene; nitrobenzene to an isomeric mixture of chloronitrobenzenes; aniline to chloroanilines; naphthalene to alpha- and beta-chloronaphthalene; anthracene to 9-chloroanthracene; and so on. The same reactions can be carried out by using other Group VIII platinum metal chlorides such as rhodium trichloride, platinum chloride, iridium chloride, or ruthenium chloride. In a like manner, by selecting Group VIII platinum metal salts containing other anions, e.g., palladous cyanide, palladous acetate, palladous methoxide, platinous phenoxide, palladous cyanate, and iridium tribromide, benzene can be converted to benzonitrile, phenyl acetate, anisole, diphenyl ether, phenyl isocyanate, and bromobenzene, respectively.

The second type of product can be obtained as a coproduct of the reactions described above. For example, under certain conditions the reaction between palladium chloride and benzene, in addition to producing chlorobenzene, produces at least some biphenyl, the dimer of the starting compound. Production of this byproduct appears to depend upon reaction temperature. For example, at 150°C. the product mixture from the reaction of palladous chloride with an excess of liquid benzene contains about 85 mole percent of biphenyl and 15 mole percent of monochlorobenzene. At 250°C. and above, however, monochlorobenzene is produced from the same reaction mixture to the substantial exclusion of biphenyl. Similarly, below about 250°C. the reaction between palladous chloride and toluene leads to an isomeric mixture of monochlorotoluenes, i.e., o-, m-, and p-chlorotoluene, and 4,4'-dimethylbiphenyl and isomers thereof. In a like manner it is possible to react palladium chloride or other Group VIII platinum metal salts with chlorobenzene to produce an isomeric mixture of dichlorobenzenes and dichlorobiphenyls, including a major proportion of 4,4'-, 3,3'-, and 3,4'-dichlorobiphenyl and a minor proportion of 2,4'-, and 2,3'-, and 2,2'-dichlorobiphenyl. Corresponding isomeric mixtures are produced from aniline, nitrobenzene, benzonitrile, phenyl acetate, etc. From naphthalene the products include, in addition to isomeric chloronaphthalenes, a mixture of 1,1'-, 1,2'-, and 2,2'-binaphthyl.

Generally, the molar ratio of aromatic compound to the Group VIII platinum metal salt used as a starting material ranges from about 0.3 to 10.

A convenient source of the anion being introduced is a protonated form of said anion, e.g., hydrogen halides such as hydrogen chloride and hydrogen bromide for chloride and bromide ions, acetic acid for acetate ion, cyanic acid for cyanate ion, etc.

If desired, the product chlorobenzene may be passed over appropriate hydrolysis catalysts by methods known to the art and converted to phenol and hydrogen chloride. The hydrogen chloride may then be used in a subsequent chlorobenzene synthesis, thus providing an overall process for phenol from benzene and oxygen:

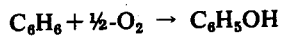

With respect to the production of monochlorobenzene, the present process exhibits several distinct advantages over the processes of the art. It gives a high conversion of benzene to monochlorobenzene with only a small amount of dichlorobenzene being formed, and, moreover, hydrogen chloride can be used as the source of chlorine. For example, conversions of over 70 weight percent of benzene to chlorinated benzenes, of which about 90 weight percent is monochlorobenzene, can be realized by this process. Another advantage of this process is the ability of the reaction medium to tolerate water. This feature eliminates the need of anhydrous reactants and simplifies the separation of the water-insoluble products from water-soluble catalyst components.

Both the liquid and the gas phase embodiments of the present process exhibit distinct advantages over the art. For example, by means of the present process it is possible to obtain monochlorobenzene with little or no simultaneous production of polychlorobenzenes. In the liquid phase embodiment, the reaction medium can tolerate water, thereby eliminating the need of anhydrous reactants and simplifying the separation of water-insoluble products from water-soluble catalyst components. The gas phase embodiment enables the process to utilize in the synthesis of chlorobenzene and other aromatic products the advantages normally attendant with vapor phase techniques, e.g., simple equipment, ready handling at elevated temperatures, convenient recycle, and the like.

The products obtainable by the present process, such as chlorobenzene, chlorotoluene, chloronitrobenzene, dichlorobenzene, benzonitrile, phenyl acetate, biphenyl, polyphenyls, and the like, find widespread commercial use as chemical intermediates in the synthesis of polymers, copolymers, dyes, insecticides, and the like.

EXAMPLE I

A mixture of 0.080 gram (0.45 millimole) of palladous chloride, 0.3 ml. of benzene, and 0.3 ml. of water was heated in a rocking sealed glass tube at 200°C. for 18 hours. The tube was cooled and opened, and the organic phase analyzed by vapor phase chromatography. It was found to contain chlorobenzene and biphenyl in a molar ratio of about 2.5:1 and in a yield of 26 percent and 9.6 percent by weight, respectively, based on palladous chloride.

EXAMPLE II

By the procedure of Example I, 0.13 gram (0.71 millimole) of palladous chloride, 0.3 ml. of benzene, and 0.3 ml. of water were heated at 150°C. for 18 hours. Analysis by vapor phase chromatography indicated the presence of chlorobenzene and biphenyl in a molar ratio of about 1:8 and in a yield of 40.3 percent and 5 percent by weight, respectively.

EXAMPLE III

By the procedure of Example I, 0.082 gram (0.46 millimole) of palladous chloride, 0.3 ml. of benzene, and 0.3 ml. of water were heated at 250°C. for 18 hours. Analysis by vapor phase chromatography indicated the presence of chlorobenzene and biphenyl in a molar ratio of about 9:1 and in a yield of 47 percent and 5 percent, respectively.

EXAMPLE IV

By the procedure of Example I, 0.18 gram (1.0 millimole) of palladous chloride and 0.6 ml. of benzene were heated 30 minutes at 250°C. Analysis by vapor phase chromatography indicated the presence of chlorobenzene and biphenyl and in a yield of 2.7 percent and 6.8 percent by weight, respectively.

EXAMPLE V

By the procedure of Example I, 0.04 gram of palladous chloride, 0.3 ml. of nitrobenzene, and 0.3 ml. of water were heated 17 hours at 145°C. Analysis of the organic phase by vapor phase chromatography revealed the presence of materials whose retention times were identical to those of chloronitrobenzenes.

EXAMPLE VI

By the procedure of Example I, 0.04 gram of palladous chloride, 0.3 ml. of toluene, and 0.3 ml. of water were heated at 145°C. for 18 hours. Analysis of the organic phase by vapor phase chromatography revealed the presence of materials whose retention times corresponded to the monochlorotoluenes and the dimethylbiphenyls.

EXAMPLE VII

By the procedure of Example I, 0.04 gram of palladous chloride, 0.3 gram of phenol, and 0.3 ml. of water were heated 2 hours at 250°C. Analysis of the organic phase by vapor phase chromatography indicated the presence of mixed monochlorophenols.

EXAMPLE VIII

By the procedure of Example I, 0.04 gram of palladous chloride, 0.3 ml. of chlorobenzene, and 0.3 ml. of water were heated 2 hours at 250°C. Analysis of the organic phase by vapor phase chromatography indicated the presence of o-, m-, and p-dichlorobenzene in the molar ratio 15:45:40.

EXAMPLE IX

By the procedure of Example I, 0.11 gram (0.54 millimole) of rhodium trichloride, 0.3 ml. of benzene, and 0.3 ml. of water were heated 30 minutes at 250°C. Analysis by vapor phase chromatography indicated the presence of chlorobenzene. The yield was 1.5 percent by weight.

EXAMPLE X

By the procedure of Example I, 0.091 gram (0.34 millimole) OF potassium chloroplatinite, 0.3 ml. of benzene, and 0.3 ml. of water were heated 30 minutes at 250°C. Analysis by vapor phase chromatography indicated the presence of chlorobenzene.

EXAMPLE XI

By the procedure of Example I, 0.04 gram of palladous chloride, 0.3 ml. of a 50 percent (by weight) solution of biphenyl in benzene, 0.2 ml. of water, and 0.2 ml. of acetic acid were heated 18 hours at 150°C. The organic phase was analyzed by vapor phase chromatography and found to contain, o-, m-, and p-diphenylbenzenes in the ratio of 15:44:41 along with chlorobenzene and monochlorobiphenyls.

EXAMPLE XII

By the procedure of Example I, 0.04 gram of palladous cyanide, 0.3 ml. of benzene, and 0.3 ml. of water were heated 60 hours at 150°C. The presence of benzonitrile was detected by characteristic retention time on vapor phase chromatographic analysis and by hydrolysis of the residue (after evaporation of the benzene) to benzoic acid. The benzoic acid was identified by mixed melting point with a sample of pure benzoic acid.

EXAMPLE XIII

By the procedure of Example I, 0.1 gram of palladous acetate and 0.3 ml. of benzene were heated for 2 hours at 250°C. Analysis of the organic phase by vapor phase chromatography indicated phenyl acetate (identified in the presence of the reaction mixture by correct retention time in three different vapor phase chromatographic columns) and biphenyl.

EXAMPLE XIV

Ten grams of 12 × 40 mesh carbon was impregnated with palladous chloride by dissolving the palladium salt in water, adding the carbon, and slowly evaporating the water in a rotating flask with heat and vacuum. The resulting material was packed in a glass tube and heated to 325°C. A stream of nitrogen saturated with benzene at room temperature was passed through the heated tube. Chlorobenzene was found in the effluent stream by vapor phase chromatographic analysis.

While there are above disclosed but a limited number of embodiments of the process of the invention herein presented, it is possible to produce still other embodiments without departing from the inventive concept herein disclosed. It is desired, therefore, that only such limitations be imposed on the appended claims as are stated therein.

What is claimed is:

1. A process for introducing a substituent onto an aromatic ring which consists in reacting an aromatic compound selected from the group consisting of benzene, nitrobenzene, toluene, phenol, chlorobenzene and biphenyl, in vapor phase with a Group VIII platinum metal carboxylate at a temperature in the range of about 20°C. to 600°C. and at a pressure in the range of about 0.25 and 250 atmospheres to produce a substituted aromatic compound wherein the substituent introduced is derived from the group consisting of the anion portion of said Group VIII platinum metal carboxylate and the aromatic compound, said Group VIII platinum metal carboxylate being selected from the group consisting of palladium, platinum, ruthenium, rhodium, osmium and iridium acetate, propionate and benzoate.

2. The process of claim 1 wherein the temperature is in the range of about 300° and 500°C.

3. The process of claim 1 wherein the temperature is in the range of about 100° to 300°C.

4. The process of claim 1 wherein the Group VIII platinum metal carboxylate is a palladium metal carboxylate.

5. The process of claim 1 wherein the Group VIII platinum metal carboxylate is a platinum metal carboxylate.

6. The process of claim 1 wherein the aromatic compound is benzene.

* * * * *